June 26, 1962 F. C. WHITESIDE 3,040,558
APPARATUS FOR PROVING METERS AND THE LIKE
Filed July 7, 1958 3 Sheets-Sheet 1

INVENTOR.
F. C. WHITESIDE
BY Floyd Trimble
ATTORNEY

June 26, 1962 F. C. WHITESIDE 3,040,558
APPARATUS FOR PROVING METERS AND THE LIKE
Filed July 7, 1958 3 Sheets-Sheet 2

INVENTOR.
F. C. WHITESIDE
BY Floyd Trimble
ATTORNEY

3,040,558
APPARATUS FOR PROVING METERS AND THE LIKE

Foster Clay Whiteside, Calgary, Alberta, Canada, assignor to Hudson's Bay Oil and Gas Company Limited, Calgary, Alberta, Canada, a corporation
Filed July 7, 1958, Ser. No. 746,829
5 Claims. (Cl. 73—3)

This invention relates, as indicated, to improvements in apparatus for proving meters and the like, and more particularly, but not by way of limitation, to an improved prover tank structure for volmetrically proving meters used in measuring liquids (such as crude oil) which tend to adhere or leave a deposit on the walls of a vessel in which the liquids are stored.

As it is well known in the oil producing and pipeline industries, systems are being installed on more and more producing oil leases for automatically transferring the custody of crude oil from a producing company to a pipeline company. These systems utilize various types of positive displacement meters for automatically measuring the amount of crude oil transferred into the gathering systems of the pipeline companies. Substantial experience and testing has proven that positive displacement meters may be used to accurately measure crude oil of substantially any composition which may be produced. However, the meters must be periodically tested, or proved, and re-calibrated to assure that the oil being transferred is properly measured.

An automatic custody transfer system of the type described above is normally located at the site of the oil producing lease. As a result, either the meters must be removed and transferred to a central location for proving and re-calibration, or a proving apparatus must be transported to the various leases for proving the meters in situ. The most desirable method is to transport a proving apparatus to the various meter locations, since the composition of the crude oil being measured will vary from one location to another and the specific crude oil being handled by a meter should be used in proving the meter. However, the support of a proving tank on a trailer or the like becomes involved, particularly when the metering systems are located in relatively undeveloped areas having poor roads. Also, it is most desirable that a prover tank have seraphin necks on the upper and lower ends thereof to give a greater degree of accuracy in measurements made by the tanks. Such seraphin necks add to the overall height of a prover tank and enhance the problem of adequately supporting the tank on a trailer or the like. Furthermore, crude oil has a tendency to adhere to, or deposit solid materials on, the inner surface of a prover tank, thereby reducing the volume of the tank for subsequent proving or calibration runs. As the deposits from crude oil build up on the inner surfaces of a prover tank, the calibration of the tank is upset, thereby interfering with precise proving of subsequent meters.

The present invention contemplates a novel apparatus for volumetrically proving meters and the like, which includes a prover tank structure mounted on a trailer in such a manner that the tank is adequately supported to eliminate contortion which would make the tank go off calibration, and the tank will have a minimum tendency to tip-over and become damaged. I contemplate the use of seraphin necks on the upper and lower ends of the tank to provide a precise measurement of liquid in the tank, with the lower seraphin neck being shorter than the upper seraphin neck to enhance the stability of the apparatus. This invention also contemplates a novel apparatus for removing crude oil deposits from the inner periphery of the tank and seraphin necks. More specifically, the present invention contemplates the use of a solvent for washing down the inner periphery of the tank and seraphin necks by use of a spraying device rotatably supported in the tank, and which spraying device may be removed during proving runs to enhance the calibration of the tank.

An important object of this invention is to facilitate the proving of meters in remotely located automatic custody transfer systems.

Another object of this invention is to provide a novel proving tank structure which may be moved over substantially any type of terrain encountered and yet will remain stabilized and not tip over on the transporting apparatus.

A further object of this invention is to provide a portable proving tank structure having seraphin necks on the upper and lower ends thereof, and yet will have a low center of gravity to provide a stabilized tank structure.

Another object of this invention is to provide a novel prover tank structure which will not become miscalibrated when measuring liquids tending to lay deposits or adhere to the inner periphery of the tank.

A further object of this invention is to provide a novel prover tank structure having means for spraying solvent onto the inner surfaces of the tank between proving runs and efficiently removing any deposits which may be adhering to the inner surfaces of the tank.

A still further object of this invention is to provide a novel solvent spraying apparatus for prover tanks which may be easily removed from and inserted in a tank, and not interfere with the calibration of the tank.

Other objects and advantages of the invention will be evident from the following detailed description, when read in conjunction with the accompanying drawings which illustrate my invention.

Figure 2:
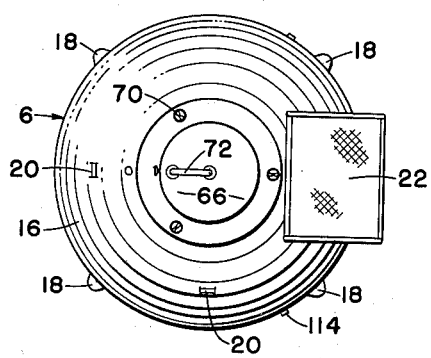
FIGURE 2 is a plan view of the apparatus illustrated in FIG. 1.
Figure 1:
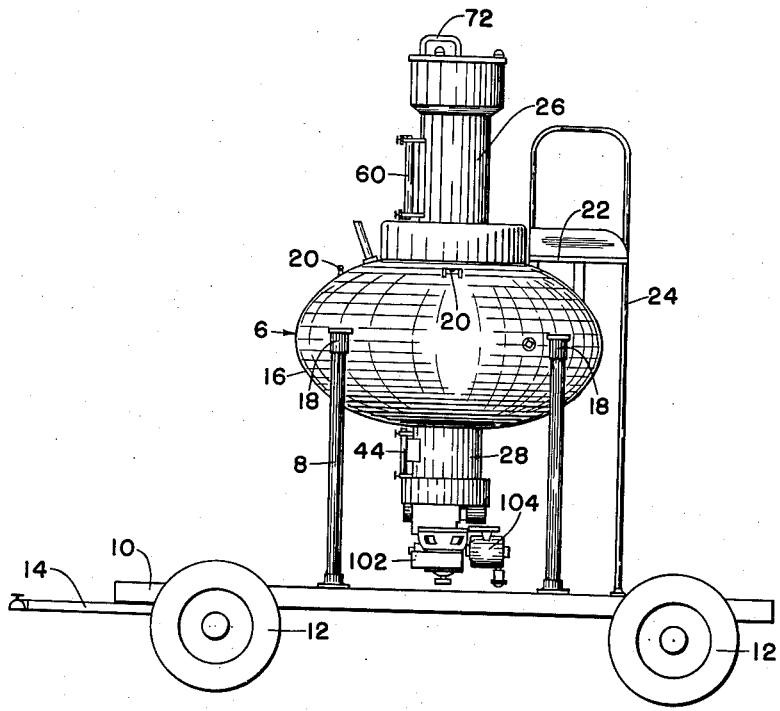
FIGURE 1 is a side elevational view of an apparatus constructed in accordance with this invention.

Referring to the drawings in detail, and particularly FIGS. 1 and 2, reference character 6 generally designates a prover tank structure supported by a plurality of legs 8 on a trailer 10. The trailer 10 may take any desired form, with suitable wheels 12 and a tongue 14 to facilitate the pulling and guiding of the trailer 10. The tank structure 6 comprises an ellipsoidally-shaped tank body 16 positioned with the major axis of the tank body extending horizontally to minimize the overall height of the tank. The legs 8 are held in sockets 18 secured in circumferentially spaced relation around the central portion of the tank body 16 to impose the entire weight of the tank structure 6 at the central point of the tank body 16 and minimize distortion of the tank, which will in turn minimize variations in the calibration of the tank. It is preferred that four of the legs 8 and sockets 18 be utilized to evenly support the tank structure 6 and minimize the possibility of the tank structure tilting with respect to the trailer 10. At least two spirit levels 20 are preferably provided on the upper portion of the tank body 16 spaced about 90 degrees apart around the circumference of the tank to facilitate the leveling of the tank prior to a proving run, as will be more fully hereinafter set forth. Also, a suitable platform 22 is supported above one side of the tank body 16 for inspection of the tank and operation of the apparatus, as will be more fully hereinafter set forth. A suitable ladder 24 extends from the trailer 10 up to the platform 22, such that an operator may easily climb onto the platform 22.

Upper and lower seraphin necks 26 and 28, respectively, are provided on the upper and lower ends of the tank body 16 to enhance the measurement of liquid in the tank. The lower seraphin neck 28 is shorter than the upper seraphin neck 26 to lower the center of gravity of the tank structure 6 and increase the stability of the tank structure 6 on the trailer 10. It will be apparent that the shorter the lower seraphin neck 28, the lower the tank body 16 may be supported with respect to the trailer 10, and the lower the center of gravity of the entire tank structure 6. The upper seraphin neck 26 is of increased length, since flow of liquid into the tank is stopped when the level of the liquid is positioned within the upper seraphin neck 26 during a proving run. The higher the seraphin neck 26, the less will be the possibility that liquid will be pumped into the tank until the liquid overflows the top of the upper seraphin neck 26. However, the length of the upper seraphin neck 26 must be retained at a reasonable figure, since the overall height of the tank structure 6 must be such that the apparatus may be easily moved under obstructions overhanging roads and highways, such as at underpasses and at bridges.

Figure 3:
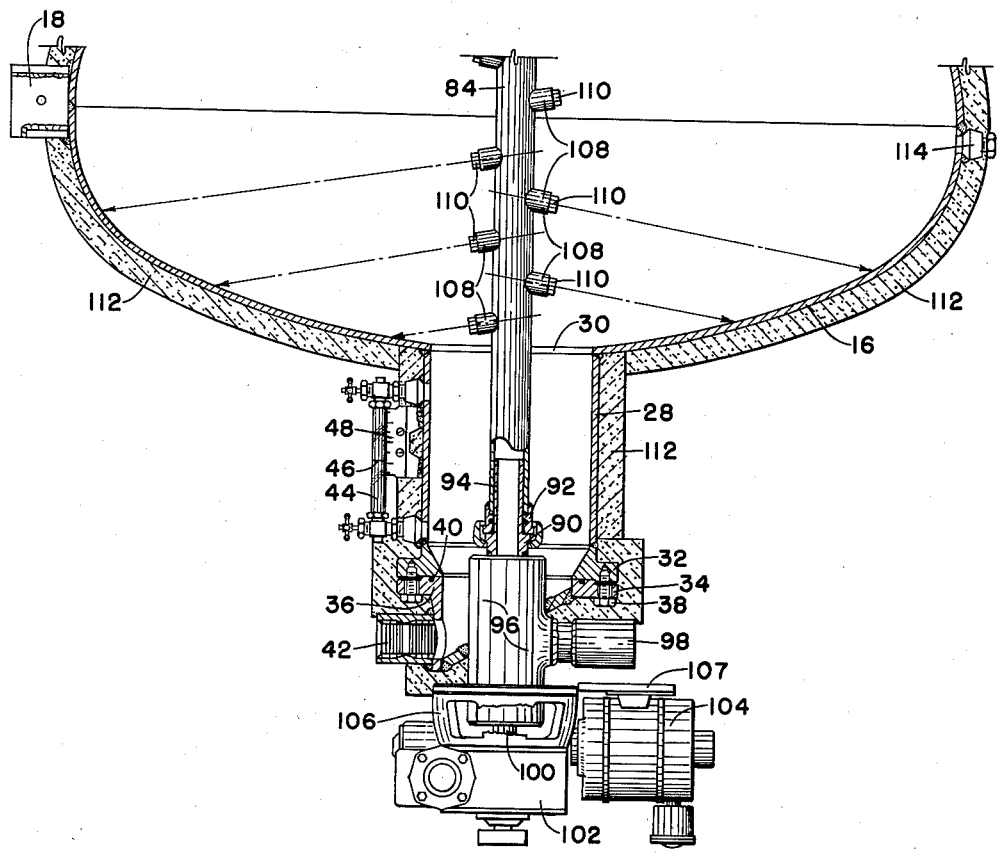
FIGURE 3 is a vertical partial sectional view, partially in elevation, of the lower half of a proving tank structure constructed in accordance with this invention, the insulated tank being in cross section and the remainder of the figure in full view except for certain cutaway portions.

As shown in FIG. 3, the lower seraphin neck 28 is welded to the bottom of the tank body 16 around an aperture 30 formed in the center of the bottom of the tank body 16. The lower end of the seraphin neck 28 is provided with a flange 32 to receive the mating flange 34 of a closure member 36. The flanges 32 and 34 are secured together by a plurality of circumferentially spaced bolts 38 in the usual manner to rigidly secure the closure member 36 over the lower end of the seraphin neck 28. Also, a suitable sealing ring 40 is disposed between the mating faces of the flanges 32 and 34 to provide a fluid tight seal between the flanges 32 and 34. A drain and fill connection 42 is secured in one side of the closure member 36 for use in both filling the tank body 16 and the seraphin necks 26 and 28 with liquid, and draining liquid from the tank body 16 and seraphin necks 26 and 28. The connection 42 is preferably a threaded connection for easily connecting a liquid flow line from a positive displacement meter (not shown) to the tank. It will also be noted that the fill and drain connection 42 communicates with the lower end of the closure member 36, such that the entire contents of the tank body 16 and upper and lower seraphin necks may be drained.

A suitable guage or sight glass 44 is secured on one side of the lower seraphin neck 28 and is provided with an index mark 46 in about the central portion thereof. The mark 46 is utilized as the "zero" line in use of the tank structure 6 for proving a meter, in that the liquid level in the lower seraphin neck 28 is arranged even with the mark 46 when a proving run is started. A suitable scale 48 is secured on the seraphin neck 28 alongside the glass 44 and is provided with suitable markings to facilitate the adjustment of the liquid level in the neck 28 to a position even with the zero mark 46. It is preferred that the guage glass 44 be of such construction that it may be easily cleaned between proving runs, since it is contemplated that the present apparatus will be used with liquids which tend to deposit a film of liquid or solid matter on the walls of any vessel or container through which they are passed.

Figure 4:
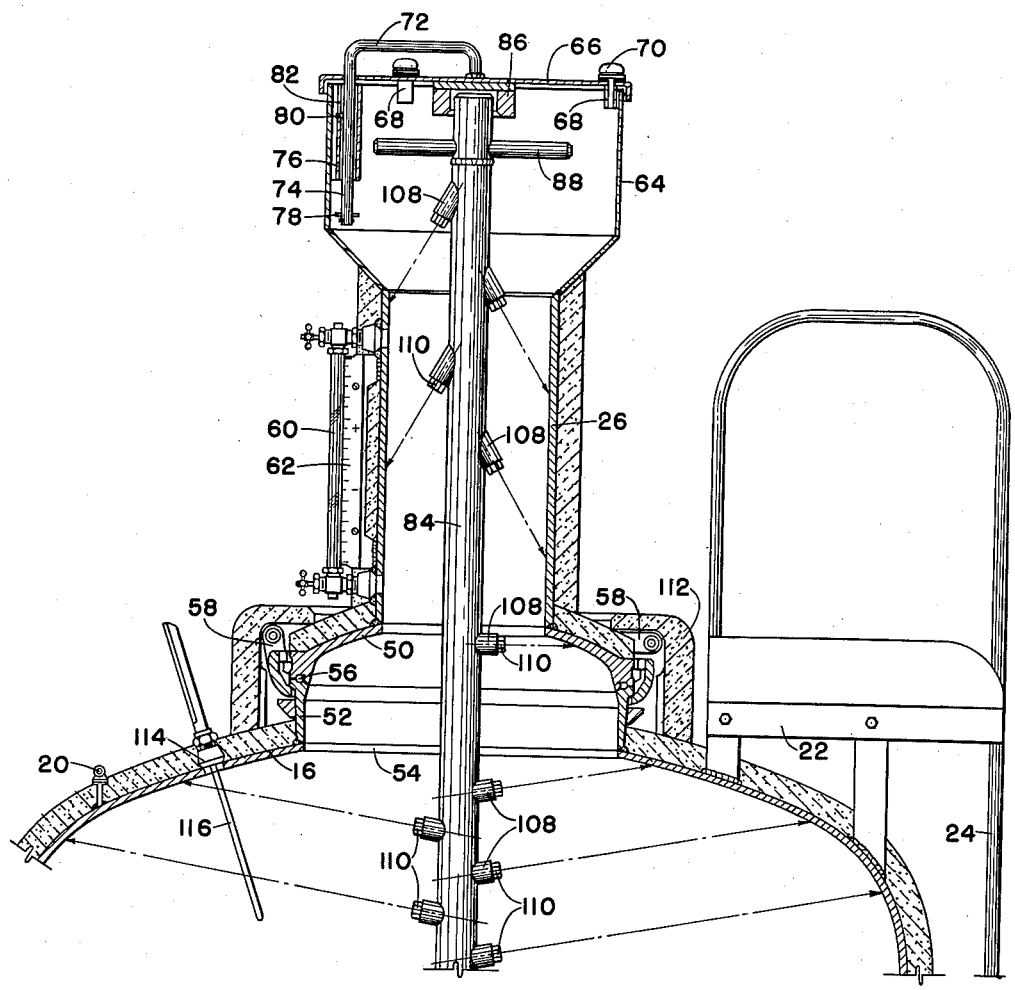
FIGURE 4 is a vertical partial sectional view, partially in elevation, of the upper half portion of a prover tank structure constructed in accordance with this invention, the insulated tank being in cross section and the remainder of the figure in full view with FIG. 4 being a continuation from the upper end of FIG. 3.

The upper seraphin neck 26, as shown in FIG. 4, is provided with a circumferential flange 50 on the lower end thereof extending outwardly and downwardly from the neck. The flange 50 is of a size to mate with the upper end of a circumferential flange 52 extending upwardly from the top of the tank body 16. It will also be noted that an enlarged aperture 54 is formed in the top central portion of the tank body 16 inside of the flange 52 to establish communication between the tank body 16 and the upper seraphin neck 26. The flanges 50 and 52 are preferably provided with mating machined faces and a suitable sealing ring 56 to provide a fluid tight connection of the seraphin neck 26 on the tank body 16. Any suitable type of coupling 58 may be used to secure the flange 50 on the flange 52, such as a "Unibolt" coupling manufactured by the Thornhill-Craver Co., Inc. of Houston, Texas. The coupling 58 is preferably of a type which may be easily opened by an operator standing on the platform 22, such that the upper seraphin neck 26 may be easily removed from the tank body 16 and access gained to the tank for inspecting the inner surfaces of the tank.

The upper seraphin neck 26 is also provided with a guage or sight glass 60 to visually indicate the level of a liquid extending into the neck 26. The sight glass 60 is preferably of substantial length, such that an operator of the apparatus can watch a rising liquid level in the neck 26 for substantial length of time. A suitable scale 62 is mounted on the side of the neck 26 adjacent the glass 60 and is provided with suitable markings to precisely guage the level of liquid extending into the upper neck 26. The position of the scale 62 is correlated with the position of the lower scale 48, such that the precise volume of liquid in the tank may be measured. For example, when using a prover tank of about five barrels capacity, the scale 62 should be positioned and so marked to indicate the level within the upper seraphin neck 26 within one-quarter inch, or measure the volume of the liquid in the tank to within plus or minus 0.002 barrel.

An enlarged cylindrical housing 64 is secured on the upper end of the upper seraphin neck 26 and is provided with a cover 66 over the upper end thereof. A plurality, preferably three, bolt receptacles 68 are secured around the inner periphery of the upper end of the housing 64 to receive bolts or screws 70 extending through the cover 66 to adequately secure the cover 66 on the housing 64. A handle 72 is secured to the top central portion of the cover 66 and extends outwardly and then downwardly through the cover 66 along one side of the housing 64. The lower end portion 74 of the handle 72 extends through a tube 76 rigidly secured in the housing 64, and a pin 78 is secured in the lower end of the handle 72 below the lower end of the tube 76 to limit the upward movement of the cover 66 and prevent loss of the cover. Also, a pin 80 is secured to one side of the downwardly extending portion 74 of the handle 72 and slidingly fits in a slot 82 in one side of the tube 76 to guide the cover 66 when the cover 66 is being placed on the housing 64.

It will be apparent that when the cover 66 is being removed, the screws 70 are unthreaded from the receptacles 68 and then the handle 72 is raised upwardly until the pin 78 contacts the lower end of the tube 76. The cover 66 may then be swung around the axis of the tube 76 away from over the housing 64. When replacing the cover 66, the cover 66 is swung over the housing 64 until the pin 80 is in alignment with the slot 82; whereupon the handle 72 may be moved downwardly through the tube 76, and the cover 60 placed over the top of the housing 64. The screws 70 will then be in alignment with the receptacles 68 for securing the cover 66 on the housing 64.

An arm 84 extends vertically through the center of the upper seraphin neck 26, as well as through the center of the tank body 16 and the lower seraphin neck 28, as will be more fully hereinafter set forth. The upper end of the arm 84 is journaled in a suitable guide 86 secured in the bottom face of the cover 66 to maintain the arm 84 in alignment with the center of the seraphin neck 26. It will also be noted that a handle 88 is secured on the upper end portion of the arm 84 to facilitate insertion and removal of the arm 84 from the tank structure 6, as will be more fully hereinafter set forth. It may be noted here, however, that when the cover 66 is removed, the guide 86 will be removed from the upper end of the arm 84, and the arm 84 may be moved upwardly through the upper seraphin neck 26 and the housing 64.

As shown in FIG. 3, the lower end of the arm 84 is supported on a tubular drive shaft 90 by means of a suitable coupling 92. The coupling 92 may be any desired type of quick-opening coupling which may be operated by pulling upwardly or by turning the arm 84 in one direction, such that the arm 84 may be easily disconnected from the drive shaft 90. For example, the coupling 92 may be a self-locking boltless "Unibolt" coupling made by the Thornhill-Craver Co., Inc. of Houston, Texas, with the male half of the coupling rigidly secured on the arm 84 and the female half rigidly secured on the drive shaft 90. The arm 84 is tubular throughout the major portion of its length, such that the lower end of the arm 84 may slidingly fit over a pilot tube 94 extending upwardly from the drive shaft 90. The pilot tube 94 facilitates the assembly of the arm 84 on the drive shaft 90 by guiding the half of the coupling 92 on the lower end of the arm 84 into the half of the coupling 92 on the drive shaft 90 when the arm 84 is being assembled in the tank structure 6.

The drive shaft 90 extends downwardly through a tubular holder 96 and is suitably supported in the holder 96 in such a manner that the drive shaft 90 may be rotated in the holder 96 but will not move vertically through the holder. Also, the drive shaft 90 is suitably apertured within the holder 96 to provide communication between a connection or socket 98 provided on one side of the holder 96 and the interior of the drive shaft 90, such that liquid fed through the connection 98 will be directed upwardly through the drive shaft 90 and the tubular arm 84. The lower end (not shown) of the drive shaft 90 is connected to the output shaft 100 of a speed reducer 102 driven by a motor 104, such that the motor 104 rotates the tubular arm 84 at the desired speed. The speed reducer 102 is suspended by a bracket 106 from the tubular holder 96, and the motor 104 is secured by a bracket 107 from the bracket 106. Also, it will be noted that the holder 96 is welded in the bottom wall of the closure member 36. Therefore, the speed reducer 102 and motor 104 are suspended from the lower seraphin neck 28 to further lower the center of gravity of the tank structure 6 and enhance the stability of the tank structure 6. If desired, a pump (not shown) may also be suspended from the bracket 106 and driven by the motor 104 to pump liquid from a suitable source of supply (not shown) into the connector 98. Such a pump would, of course, be connected by suitable hoses (not shown) to the source of liquid supply and the connector 98. Liquid would then be supplied to the tubular arm 84 at the same time the arm 84 is rotated, and by the use of the same power source. Also, of course, the pump would add to the weight imposed on the lower seraphin neck 28 and further lower the center of gravity of the tank structure 6.

As shown in both FIGS. 3 and 4, a plurality of couplings 108 are secured in vertically spaced relation along the tubular arm 84 throughout the height of the tank body 16, as well as throughout the length of the upper seraphin neck 26. The couplings 108 are extended at various directions from the arm 84 toward the inner surfaces of the top, sides and bottom of the tank body 16, and the sides of the upper seraphin neck 26. Each coupling 108 has a jet spray nozzle 110 of any suitable type secured therein for spraying liquid from the tubular arm 84 onto the inner periphery of the tank body 16 and the upper seraphin neck 26, as illustrated by the arrows in FIGS. 3 and 4.

The tank body 16 and the seraphin necks 26 and 28 are preferably covered with a suitable insulating material 112, such that the temperature of a liquid fed into the tank 6 will not appreciably change during a proving run.

Also, the insulation 112 minimizes contraction and expansion of the tank body 16 and necks 26 and 28 to enhance the maintenance of the calibration of the tank structure 6. A plurality of thermometer wells 114 are provided around the tank body 16 to receive thermometers 116 as illustrated in FIG. 4. Furthermore, it is desirable to line or coat the inner surfaces of the tank body 16 and necks 26 and 28 with a material, such as Epon resin, which will resist the adherence of crude oil.

*Operation*

Before using the tank structure 6 to prove a meter, the tubular arm 84 is preferably removed to prevent the liquid being handled from clogging the spray jets 110 and to facilitate the accuracy of the proving run. The arm 84 is removed by first disconnecting the cover 66 from the housing 64 and swinging the cover 66 around the tube 76 until the cover is clear of the upper end of the housing 64. The operator, by standing on the platform 22, then grips the handle 88 and manipulates the arm 84 to disconnect the coupling 92 between the lower end of the arm 84 and the drive shaft 90. The arm 84 may then be lifted vertically out of the tank structure and placed aside. The cover 66 is then replaced on the housing 64, and the connector 98 is plugged to prevent leakage through the drive shaft 90, holder 96 and the connector 98. Also, the tank is leveled by adjusting the trailer wheels 12 (as by jacking up the trailer). The spirit levels 20 are used in leveling the tank.

The fill and drain connection 42 is then connected to the meter to be proved, and the lower seraphin neck 28 is filled up to the zero mark 46 on the lower sight glass 44 with the type of liquid normally measured by the meter. It will be assumed that the liquid being handled and measured is crude oil, as will be the case when proving the meter of a crude oil automatic custody transfer system. The meter being proved is then placed in operation and the crude oil measured by the meter is directed through the fill and drain connection 42 into the lower seraphin neck 28. This operation is continued until the liquid level in the upper seraphin neck 26 reaches approximately the middle of the upper sight glass 60. The flow of fluid through the meter and into the tank 6 is then stopped and the precise volume of the crude oil transferred into the tank is determined by reading the scale 62 opposite the sight glass 60. Also, the temperature of the crude oil in the tank body 16 is read from the thermometers 116, such that the gross volume measured by the scale 62 may be corrected to a standard temperature, such as 60° F., providing the meter being proved has a temperature compensator. The volume measured by the prover tank structure 6 is then compared with the reading obtained from the meter being proven, such that the accuracy of the meter may be determined.

After the meter has been proved, the meter is disconnected from the fill and drain connection 42 and the crude oil is drained from the tank body 16 and the seraphin necks 26 and 28 to a suitable disposal vessel (not shown). The cover 66 is then again removed from the housing 64 and the tubular arm 84 inserted downwardly through the housing 64, upper seraphin neck 26, tank body 16 and lower seraphin neck 28 over the pilot 94. As previously indicated, the pilot 94 facilitates the guiding of the lower end of the arm 84 onto the drive shaft 90 to facilitate the connection of the coupling 92. The operator standing on the platform 22 may manipulate the arm 84 by use of the handle 88 to suitably engage the coupling 92 and rigidly secure the arm 84 to the drive shaft 90. The cover 66 is then again replaced on the housing 64 and the guide 86 positioned over the upper end of the arm 84.

With the arm 84 in operating position in the tank structure, the connector 98 is placed in communication with a supply of a suitable solvent and the solvent is pumped through the connector 98, holder 96 and drive shaft 90 into the tubular arm 84 and discharged through the couplings 108 and spray jets 110 onto the inner periphery of the tank body 16 and the upper seraphin neck 26. Simultaneously with the feeding of solvent, the motor 104 is placed in operation to rotate the arm 84. It will then be apparent that the solvent will be sprayed around the entire inner periphery of the tank body 16 and the upper seraphin neck 26 to wash any deposited liquid film or solid matter from the tank body 16 and the upper seraphin neck 26. The solvent will drain downwardly along the sides of the upper seraphin neck 26, the tank body 16, and the lower seraphin neck 28 out through the fill and drain connection 42. It should also be noted that the sloping bottom of the tank body 16 facilitates a fast drainage of the solvent into the lower seraphin neck 28.

When handling crude oil, as previously described, a film of the crude oil will tend to adhere to the inner surface of the seraphin necks 26 and 28 and the tank body 16. If the tank structure 6 is washed following each prover run, or after a limited number of prover runs, the film of crude oil or solid deposits from the crude oil may be easily removed from the inner surfaces of the seraphin necks 26 and 28 and the tank body 16, such that the calibration of the tank structure will not be upset. Any suitable solvent may be used which will efficiently wash off the material deposited on the inner surfaces of the seraphin necks and tank body. When using crude oil, the solvent may be, for example, unleaded gasoline, naphtha or benzene. Any of these solvents may be easily pumped into the tubular arm 84 and sprayed through the jets 110 in an efficient manner at substantially any desired pressure.

As previously noted, the lower seraphin neck 28 may be substantially shorter than the upper seraphin neck 26. The length of the lower seraphin neck 28 is not limiting, since the liquid being measured may be manually poured into the lower seraphin 28, or drained from the seraphin neck 28, to precisely locate the level of the liquid to the zero mark 46 when beginning a proving run. However, it is desirable that the upper seraphin neck 26 be of substantial length to minimize the possibility of overflowing the apparatus. In a normal proving operation liquid is pumped into the proving tank at such a rate that it takes only a very few seconds for the liquid to rise all the way through the upper seraphin neck 26. Therefore, the upper seraphin neck 26 should be of a length such that the operator may stop the flow of liquid into the tank after the liquid level appears in the sight glass 60, but before the liquid level is raised above the sight glass 60.

When re-calibrating the tank structure 6, or whenever desired, the operator may open the coupling 58 securing the upper seraphin neck 26 on the tank body 16. The upper seraphin neck 26 may then be removed, such that the operator may gain access to the interior of the tank body 16, as well as the interior of the upper seraphin neck 26, for inspection of the inner surfaces of these members. The insulation 112 extending around the flanges 50 and 52 and the coupling 58 may be easily constructed for convenient removal when desiring to open the coupling 58.

From the foregoing it will be apparent that the present invention will facilitate the proving of positive displacement meters and the like, and particularly positive displacement meters used in measuring crude oil and similar liquids which tend to leave a deposit on the inner surface of any vessel in which they are contained. The present proving tank structure will be stable and easily mounted on a trailer or the like, such that the tank structure will yet will have a minimum tendency to tilt with respective to the trailer on which the tank is supported. It will also be apparent that the present tank structure includes a novel spraying means for removing any liquid film or solid matter deposited on the inner surfaces of the tank structure. It may be further noted that the use of a rotating spraying means reduces the number of spray jets required to adequately spray the entire inner periphery of the proving tank structure.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. Apparatus for volumetrically proving meters and the like, comprising a calibrated tank substantially in the shape of an ellipsoid; an upper seraphin neck on the upper end of said tank; a lower seraphin neck on the lower end of said tank; a drain and fill connection in the lower end of said lower neck, whereby said tank is alternately filled and drained; a drive shaft rotatably supported in a vertical position in said lower neck; a tubular arm connectably coupled to the upper end of said drive shaft and extending upwardly through the central portion of said tank into said upper neck; a guide carried by said upper neck rotatably supporting the upper end of said arm; means for rotating said drive shaft and said arm; a plurality of jets carried by said arm and directed toward the top, bottom and sides of said tank and the sides of said upper neck; means for feeding solvent to said arm for spraying the solvent through said jets and washing the inner periphery of said tank following the draining of liquid from said tank.

2. Apparatus as defined in claim 1 characterized further to include a plurality of leveling means affixed to said tank, and characterized further to include at least one thermometer affixed to said tank and adapted to measure the interior temperature thereof.

3. Apparatus as defined in claim 1 characterized further to include a sight glass mounted on each of said necks to measure liquid in said tank.

4. Apparatus for volumetrically proving meters and the like, comprising a vertically extending calibrated tank having its bottom sloped downwardly and inwardly toward the central portion thereof; seraphin necks connected to the upper and lower ends of the tank; a fill and drain connection in the lower seraphin neck for filling the tank with liquid measured by a meter, and, alternately, draining the tank; a drive shaft rotatably supported in the lower seraphin neck in a vertical position; a tubular arm removably connected to the upper end of the drive shaft and extending upwardly through the central portion of the tank and into the upper seraphin neck; a cover removably secured on the upper seraphin neck; a guide carried by said cover rotatably supporting the upper end of the arm and facilitating removal of the arm; means for rotating the drive shaft and the arm; a plurality of jets carried by the arm and directed toward the top, sides and bottom of the tank and the sides of the upper seraphin neck; and means for feeding solvent to the arm for spraying the solvent through the jets and washing the inner periphery of the tank following the draining of said liquid from the tank.

5. Apparatus for volumetrically proving remotely located meters and the like, comprising a trailer; a tank substantially in the form of an ellipsoid; legs supporting the tank on the trailer with the major axis of the ellipsoidally-shaped tank extending horizontally, said legs being secured to the central portion of the tank; seraphin necks on the upper and lower ends of the tank, the lower seraphin neck being shorter than the upper seraphin neck; a drain and fill connection in the lower end of the lower seraphin neck for filling the lower seraphin neck, the tank and a portion of the upper seraphin neck with liquid measured by a meter, and, alternately, draining the tank and seraphin necks; a drive shaft rotatably secured in the lower end of the lower seraphin neck; solvent spraying means rotatably supported in the tank and extending vertically through the central portion of the tank and the seraphin necks, a quick-opening type coupling securing the lower end of the spraying means to the drive shaft; a cover removably secured on the upper seraphin neck; a guide being secured to said cover to facilitate removal of the arm and jets upwardly through the tank and upper seraphin neck before use of the tank in proving a meter, and a motor supported on the lower seraphin neck for rotating the solvent spraying means.

References Cited in the file of this patent

UNITED STATES PATENTS

| | | |
|---|---|---|
| 2,050,800 | Lane et al. | Aug. 11, 1936 |
| 2,778,218 | Sault | Jan. 22, 1957 |

FOREIGN PATENTS

| | | |
|---|---|---|
| 16,447 | Germany | Jan. 4, 1882 |
| 26,377 | Finland | Jan. 30, 1954 |
| 718,292 | Great Britain | Nov. 10, 1954 |

UNITED STATES PATENT OFFICE
CERTIFICATE OF CORRECTION

Patent No. 3,040,558                          June 26, 1962

Foster Clay Whiteside

It is hereby certified that error appears in the above numbered patent requiring correction and that the said Letters Patent should read as corrected below.

Column 7, line 39, after "seraphin" insert -- neck --; line 71, after "will" insert -- obtain the maximum accuracy in volume measurement, --; line 72, for "respective" read -- respect --.

Signed and sealed this 20th day of November 1962.

SEAL)
test:

RNEST W. SWIDER                        DAVID L. LADD
:testing Officer                           Commissioner of Patents